United States Patent
Tomioka et al.

(10) Patent No.: US 7,279,097 B2
(45) Date of Patent: Oct. 9, 2007

(54) COMPOSITE SEMIPERMEABLE MEMBRANE, AND PRODUCTION PROCESS THEREOF

(75) Inventors: Hiroki Tomioka, Shiga (JP); Kazuya Sugita, Kyoto (JP); Katsufumi Oto, Shiga (JP)

(73) Assignee: Toray Industries, Inc., Tokyo (JP)

( * ) Notice: Subject to any disclaimer, the term of this patent is extended or adjusted under 35 U.S.C. 154(b) by 354 days.

(21) Appl. No.: 10/865,888

(22) Filed: Jun. 14, 2004

(65) Prior Publication Data

US 2004/0256309 A1    Dec. 23, 2004

(30) Foreign Application Priority Data

Jun. 18, 2003 (JP) ............................... 2003-172955
Aug. 29, 2003 (JP) ............................... 2003-306322

(51) Int. Cl.
B01D 61/02  (2006.01)
B01D 39/16  (2006.01)
B01D 63/00  (2006.01)
B01D 61/08  (2006.01)

(52) U.S. Cl. ..................... 210/500.38; 210/500.37; 210/650; 210/652; 210/490

(58) Field of Classification Search ............ None
See application file for complete search history.

(56) References Cited

U.S. PATENT DOCUMENTS 4,769,148 A    9/1988 Fibiger et al.
4,859,384 A    8/1989 Fibiger et al.
5,051,178 A    9/1991 Uemura et al.
5,160,619 A    11/1992 Yamaguchi et al.
5,336,409 A *  8/1994 Hachisuka et al. ......... 210/490
5,755,964 A    5/1998 Mickols
6,368,507 B1   4/2002 Koo et al.

FOREIGN PATENT DOCUMENTS

| EP | 0 014 054 A1 | 8/1980 |
| EP | 0 313 354 A1 | 4/1989 |
| EP | 0 361 092 A2 | 4/1990 |
| EP | 1 136 116 A1 | 9/2001 |
| JP | 1-180208 | 7/1989 |
| JP | 5-92128 | 4/1993 |
| JP | A 6-39254 | 2/1994 |
| JP | A 6-254364 | 9/1994 |
| JP | A 11-19493 | 1/1999 |
| WO | WO 97/27935 | 8/1997 |
| WO | WO97/27935 | 8/1997 |

* cited by examiner

*Primary Examiner*—Krishnan S. Menon
(74) *Attorney, Agent, or Firm*—Oliff & Berridge, PLC

(57) ABSTRACT

A composite semipermeable membrane which satisfies the following relationship when seawater at 25° C. having a pH of 6.5, a boron concentration of 5 ppm and a TDS concentration of 3.5% by weight is permeated under an operation pressure of 5.5 MPa: Boron removal ratio (%)≧95−4× membrane permeation flow rate ($m^3/m^2$·day).

14 Claims, 1 Drawing Sheet

COMPOSITE SEMIPERMEABLE MEMBRANE, AND PRODUCTION PROCESS THEREOF

BACKGROUND OF THE PRESENT INVENTION

1. Field of the Invention

The present invention relates to a composite semipermeable membrane useful for selective separation of a liquid mixture, and to a production process thereof. For example, the present invention relates to a composite semipermeable membrane which comprises a separating functional layer comprising polyamide formed on a porous substrate film and which is favorable for removing boron from seawater or brackish water, and to a production process thereof.

2. Brief Description of the Background Art

Recently, desalting seawater through a composite semipermeable membrane has been tried, and now, it has been put into practical use in water plants all over the world. A composite semipermeable membrane generally comprises a separating functional layer coated on a porous substrate film. When the separating functional layer is formed by using crosslinked aromatic polyamide, there are such advantages that the layer is stiff and rigid since it contains a benzene ring and that the layer can be readily formed by interfacial polycondensation of aromatic polyfunctional amine and aromatic polyfunctional acid halide, and other advantages such as a high salt removal ratio and a high permeation flow rate are known (JP-A-1-180208 and JP-A-2-115027).

However, the water quality standard in the art is controlled more and more severely these days. In particular, it is difficult to reduce the minor boron in seawater to a level acceptable for drinking water in ordinary treatment, and some composite semipermeable membranes have been proposed for solving this problem (JP-A-11-19493 and JP-A-2000-259388). However, since these membranes are expected to have a membrane permeation flow rate of 0.5 $m^3/m^2 \cdot day$ or less and a boron removal ratio at most about 91 to 92% when seawater at 25° C. having a pH of 6.5, a boron concentration of 5 ppm and a TDS concentration of 3.5% by weight is permeated under an operation pressure of 5.5 MPa, development of composite semipermeable membranes which have higher solute-rejection performance has been desired.

As means for improving the solute-rejection performance of composite semipermeable membranes, a method in which a novel reactant is added to the reaction solution is exemplified. Since this method does not so much differ from conventional methods, it is useful as a simple improved method. For example, it is described that in the composite semipermeable membrane, crosslinked polyamide is constituted by a polyamine component having at least two amino groups in the molecule, and an acid component, as a novel reactant, which comprises a linear aliphatic poly-acid halide having at least two halogenocarbonyl groups in the molecule (Japanese Patent 3,031,763). Although it is described that the method provides a composite semipermeable membrane having a high salt removal ratio and a high permeation flow rate and a production process thereof, it is still impossible to further increase the boron rejection ratio according to the method.

SUMMARY OF THE INVENTION

An object of the present invention is to provide a composite semipermeable membrane having a high salt removal ratio and high rejection performance for even substances non-dissociative in a neutral region such as boric acid, and to provide a production process thereof.

In order to accomplish the above and other objects, the present invention provides the followings:

(1) A composite semipermeable membrane which satisfies the following relationship when seawater at 25° C. having a pH of 6.5, a boron concentration of 5 ppm and a TDS concentration of 3.5% by weight is permeated under an operation pressure of 5.5 MPa:

Boron removal ratio (%)≧95−4×membrane permeation flow rate ($m^3/m^2 \cdot day$).

(2) The composite semipermeable membrane according to (1), wherein monofunctional amine binds to and/or adsorbs to the inside and/or surface of the composite semipermeable membrane.

(3) The composite semipermeable membrane according to (1), which comprises a separating functional layer comprising polyamide formed on a porous substrate film, wherein monofunctional amine binds to and/or adsorbs to the inside and/or surface of the separating functional layer comprising polyamide.

(4) The composite semipermeable membrane according to (3), wherein the monofunctional amine is contained in an amount of 0.1 to 15 mol % per all amine molecules in the separating functional layer comprising polyamide.

(5) The composite semipermeable membrane according to (2), wherein the monofunctional amine is bound via a covalent bond.

(6) The composite semipermeable membrane according to (2), wherein the monofunctional amine is monofunctional aliphatic amine.

(7) The composite semipermeable membrane according to (6), wherein the monofunctional aliphatic amine has a total of 1 to 7 carbon atom(s).

(8) The composite semipermeable membrane according to (7), wherein the monofunctional aliphatic amine is at least one selected from the group consisting of methylamine, dimethylamine, ethylamine, diethylamine, propylamine, isopropylamine, diisopropylamine, butylamine, isobutylamine, t-butylamine, amylamine, t-amylamine, 1,2-dimethylpropylamine, 1-ethylpropylamine, 2-methylbutylamine, isoamylamine, N-ethylpropylamine, N-methylbutylamine, 1,3-dimethylbutylamine, 3,3-dimethylbutylamine, N-ethylbutylamine, hexylamine, N-methylpentylamine, and heptylamine.

(9) The composite semipermeable membrane according to (1), which comprises a separating functional layer, wherein an aliphatic acyl group binds to the inside and/or surface of the separating functional layer.

(10) The composite semipermeable membrane according to (1), which comprises a separating functional layer comprising polyamide formed on a porous substrate film, wherein an aliphatic acyl group binds to the inside and/or surface of the separating functional layer comprising polyamide.

(11) The composite semipermeable membrane according to (1), which comprises a separating functional layer comprising polyamide formed on a porous substrate film, wherein the separating functional layer comprising polyamide is formed on the porous substrate film, and the separating functional layer comprising polyamide comprises crosslinked polyamide formed by means of interfacial polycondensation by contacting, on the porous substrate film, (a) an aqueous solution comprising polyfunctional amine, (b) an organic solvent solution comprising polyfunctional acid halide, and (c) an organic solvent solution comprising aliphatic acid halide which is different from the polyfunctional acid halide and has 1 to 4 carbon atom(s).

(12) The composite semipermeable membrane according to (1), which comprises a separating functional layer comprising polyamide formed on a porous substrate film, wherein the separating functional layer comprising polyamide is formed on the porous substrate film, and the separating functional layer comprising polyamide comprises crosslinked polyamide formed by means of interfacial polycondensation by contacting, on the porous substrate film, (a) an aqueous solution comprising polyfunctional amine with (b) an organic solvent solution comprising polyfunctional acid halide and aliphatic acid halide which is different from the polyfunctional acid halide and has 1 to 4 carbon atom(s).

(13) The composite semipermeable membrane according to (11), wherein the aliphatic acid halide is at least one selected from the group consisting of methanesulfonyl chloride, acetyl chloride, propionyl chloride, butyryl chloride, oxalyl chloride, malonic acid dichloride, succinic acid dichloride, maleic acid dichloride, fumaric acid dichloride, chlorosulfonylacetyl chloride, and N,N-dimethylaminocarbonyl chloride.

(14) The composite semipermeable membrane according to (12), wherein the aliphatic acid halide is at least one selected from the group consisting of methanesulfonyl chloride, acetyl chloride, propionyl chloride, butyryl chloride, oxalyl chloride, malonic acid dichloride, succinic acid dichloride, maleic acid dichloride, fumaric acid dichloride, chlorosulfonylacetyl chloride, and N,N-dimethylaminocarbonyl chloride.

(15) The composite semipermeable membrane according to (1), which has a membrane permeation flow rate of 0.5 $m^3/m^2 \cdot day$ or more and a boron removal ratio of 93% or more, when seawater at 25° C. having a pH of 6.5, a boron concentration of 5 ppm and a TDS concentration of 3.5% by weight is permeated under an operation pressure of 5.5 MPa.

(16) The composite semipermeable membrane according to (1), which has a TDS transmission coefficient is $3 \times 10^{-8}$ m/s or less, when seawater at 25° C. having a pH of 6.5, a boron concentration of 5 ppm and a TDS concentration of 3.5% by weight is permeated under an operation pressure of 5.5 MPa.

(17) A process for producing the composite semipermeable membrane according to (1), which comprises carrying out a process selected from the following (I), (II), (III) and (IV):

(I) forming a separating functional layer on a porous substrate film, and contacting a solution comprising monofunctional amine with the separating functional layer;

(II) contacting (a) an aqueous solution comprising polyfunctional amine which has at least two primary and/or secondary amino groups, with (b) a porous substrate film, followed by contact with a solution of a water-immiscible organic solvent comprising polyfunctional acid halide having at least two acid halide groups to thereby form, on the porous substrate film, a separating functional layer comprising crosslinked polyamide by means of interfacial polycondensation, wherein the aqueous solution comprising polyfunctional amine comprises monofunctional amine;

(III) contacting (a) an aqueous solution comprising polyfunctional amine which has at least two primary and/or secondary amino groups, with (b) a porous substrate film, followed by contacting with a solution of a water-immiscible organic solvent comprising a polyfunctional acid halide having at least two acid halide groups to thereby form, on the porous substrate film, a separating functional layer comprising crosslinked polyamide by means of interfacial polycondensation, and then contacting (a) an organic solvent solution comprising aliphatic acid halide which is different from the polyfunctional acid halide and has 1 to 4 carbon atom(s), in an amount of 3 mol % or more per the polyfunctional acid halide, with (b) the separating functional layer; and (IV) contacting (a) an aqueous solution comprising polyfunctional amine which has at least two primary and/or secondary amino groups, with (b) a porous substrate film, followed by contacting with a solution of a water-immiscible organic solvent comprising a polyfunctional acid halide having at least two acid halide groups and an aliphatic acid halide which is different from the polyfunctional acid halide and has 1 to 4 carbon atom(s), in an amount of 3 to 50 mol % per the polyfunctional acid halide to thereby form, on the porous substrate film, a separating functional layer comprising crosslinked polyamide by means of interfacial polycondensation.

(18) A composite semipermeable membrane element which comprises the composite semipermeable membrane according to (1).

(19) A composite semipermeable membrane element which comprises the composite semipermeable membrane produced by the process according to (17).

(20) A fluid separation equipment which comprises the composite semipermeable membrane element according to (18).

(21) A fluid separation equipment which comprises the composite semipermeable membrane element according to (19).

(22) A method for water treatment, which comprises using the composite semipermeable membrane according to (1).

(23) A method for water treatment, which comprises using the composite semipermeable membrane produced by the process according to (17).

DISCLOSURE OF THE INVENTION

Figure 1:
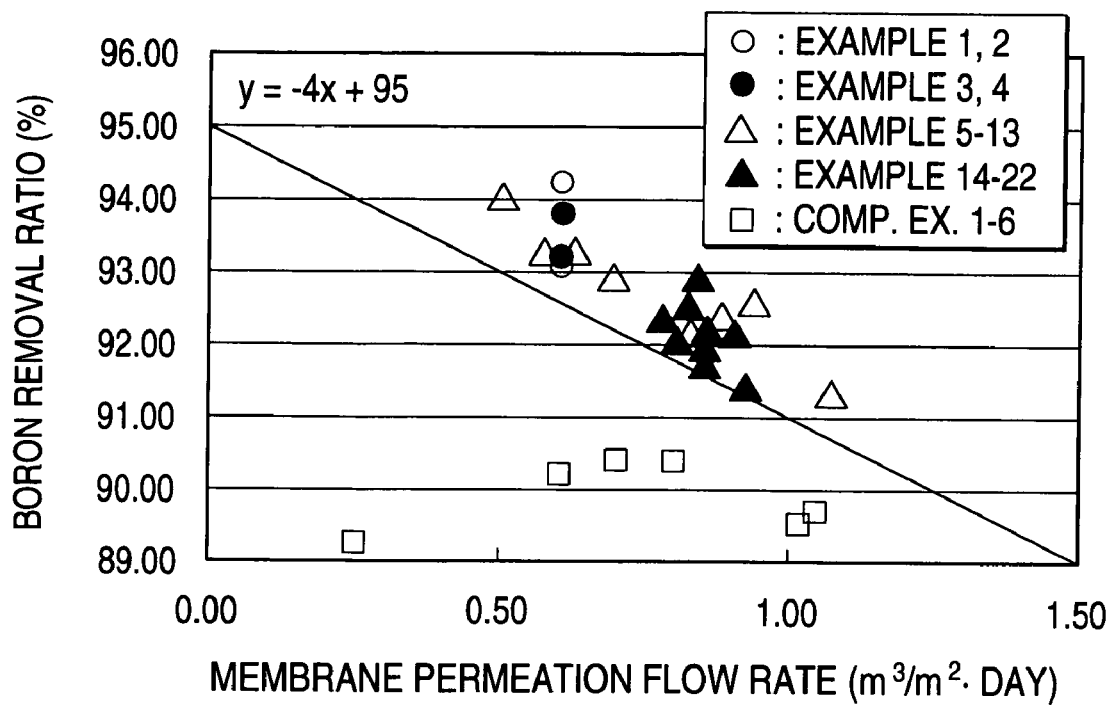
FIG. 1 is a graph showing the membrane permeation flow rate and the boron removal ratio of the membranes produced in Examples and Comparative Examples.

The present invention provides a composite semipermeable membrane which has high salt removal performance and can reject even substances, at a high removal ratio, which are non-dissociative in a neutral region and are therefore hardly removed to a high extent with conventional reverse osmosis membranes. Accordingly, since the composite semipermeable membrane can reject boron, at a high removal ratio, which is heretofore hardly removed to a high extent, particularly in desalting of seawater, it can be suitably used for preparation of drinking water by reverse osmosis.

The composite semipermeable membrane of the present invention satisfies the following relationship, when seawater at 25° C. having a pH of 6.5, a boron concentration of 5 ppm and a TDS concentration of 3.5% by weight is permeated under an operation pressure of 5.5 MPa:

Boron removal ratio (%)≧95−4×membrane permeation flow rate (m$^3$/m$^2$·day).

In order to obtain the composite semipermeable membrane, for example, employable is a method of making monofunctional amine or an aliphatic acyl group exist inside and/or on the surface of the membrane. For example, a separating functional layer having substantially separating performance of ions, etc. is provided on a porous substrate film substantially not having such separating performance, and monofunctional amine and/or an aliphatic acyl group is made to exist inside and/or on the surface of the separating functional layer. The monofunctional amine can exist inside or on the surface of the separating functional layer by binding or adhesion, and the aliphatic acyl group can exist inside or on the surface thereof by binding.

Preferably, the separating functional layer consists of crosslinked polyamide which is chemically stable to acid and alkali, or comprises the crosslinked polyamide as a main component. It is preferred that the crosslinked polyamide is formed by interfacial polycondensation of polyfunctional amine and polyfunctional acid halide, and that at least one of the polyfunctional amine and the polyfunctional acid halide contains a trifunctional or higher polyfunctional compound.

The thickness of the separating functional layer is generally from 0.01 to 1 μm, and preferably from 0.1 to 0.5 μm, in order to obtain sufficient separating performance and permeation water amount.

The polyfunctional amine means an amine having at least two primary and/or secondary amino groups in one molecule. Example include aromatic polyfunctional amines in which at least two amino groups bind to the benzene ring at an ortho-, meta- or para-position, such as phenylenediamine, xylylenediamine, 1,3,5-triaminobenzene, 1,2,4-triaminobenzene, and 3,5-diaminobenzoic acid; aliphatic amines, such as ethylenediamine and propylenediamine; alicyclic polyfunctional amines, such as 1,2-diaminocyclohexane, 1,4-diaminocyclohexane, piperazine, 1,3-bispiperidylpropane, and 4-aminomethylpiperazine; and the like. Above all, aromatic polyfunctional amines having 2 to 4 primary and/or secondary amino groups in one molecule are preferred in view of the selective separability, permeability and heat resistance of the membrane. As the polyfunctional aromatic amines, preferred are m-phenylenediamine, p-phenylenediamine, and 1,3,5-triaminobenzene. Among these, m-phenylenediamine (hereinafter referred to as "m-PDA") is more preferred in view of the availability and hand/ability. These polyfunctional amines can be used alone or as a mixture thereof.

The polyfunctional acid halide means acid halide having at least two halogenocarbonyl groups in one molecule. Examples thereof include trifunctional acid halides, for example, trimesic acid chloride, 1,3,5-cyclohexanetricarboxylic acid trichloride, 1,2,4-cyclobutanetricarboxylic acid trichloride, and the like; and bifunctional acid halides, for example, aromatic bifunctional acid halides, such as biphenyldicarboxylic acid dichloride, azobenzenedicarboxylic acid dichloride, terephthalic acid chloride, isophthalic acid chloride, and naphthalenedicarboxylic acid chloride; aliphatic bifunctional acid halides, such as adipoyl chloride and sebacoyl chloride; alicyclic bifunctional acid halides, such as cyclopentanedicarboxylic acid dichloride, cyclohexanedicarboxylic acid dichloride, and tetrahydrofurandicarboxylic acid dichloride; and the like. In view of the reactivity with polyfunctional amine, the polyfunctional acid halide is preferably polyfunctional acid chloride. In view of the selective separability and the heat resistance of the membrane, preferred is polyfunctional aromatic acid chloride having 2 to 4 carbonyl chloride groups in one molecule. Above all, more preferred is trimesic acid chloride in view of the availability and handlability. These polyfunctional acid halides can be used alone or as a mixture thereof.

The monofunctional amine means a compound having one amino group in one molecule. Examples thereof include monofunctional aromatic amines, for example, aniline, methylaniline, ethylaniline, dimethylaniline, propylaniline, ethylmethylaniline, benzylamine, fluoroaniline, chloroaniline, bromoaniline, aminophenol, aminobenzoic acid, aminobenzenesulfonic acid, aminonaphthalene, and the like; and monofunctional aliphatic amine, for example, methylamine, dimethylamine, ethylamine, diethylamine, propylamine, isopropylamine, diisopropylamine, butylamine, isobutylamine, t-butylamine, amylamine, t-amylamine, 1,2-dimethylpropylamine, 1-ethylpropylamine, 2-methylbutylamine, isoamylamine, N-ethylpropylamine, N-methylbutylamine, 1,3-dimethylbutylamine, 3,3-dimethylbutylamine, N-ethylbutylamine, hexylamine, N-methylpentylamine, heptylamine, and the like. These monofunctional amines can have any other functional group, so long as they have one amino group in one molecule. In view of the availability, inexpensiveness, handlability and solubility, preferred is monofunctional aliphatic amine. These monofunctional amines can be used alone or as a mixture thereof.

The method of making the monofunctional amine exist in the separating functional layer is not particularly limited. For example, the monofunctional amine can be made to exist inside or on the surface of the separating functional layer formed by interfacial polycondensation of polyfunctional amine and polyfunctional acid halide. However, when an acid exists, the monofunctional amine may form a salt and readily dissolve in water. Accordingly, in view of the durability of the composite semipermeable membrane, it is preferred that the monofunctional amine is made to exist in the semipermeable membrane by forming a covalent bond by a reaction with a halogenocarbonyl group.

In order that the monofunctional amine is made to exist inside or on the surface of the separating functional layer by adhesion or a covalent bond of the amine to the layer, for example, employable are a method in which monofunctional amine is dissolved in water, then a separating functional layer is formed on a porous substrate film, and then the solution comprising the monofunctional amine is brought into contact with the separating functional layer, and a method in which an aqueous solution comprising polyfunctional amine having at least two primary and/or secondary amino groups is brought into contact with a porous substrate film, followed by contact with a solution of a water-immiscible organic solvent comprising polyfunctional acid halide having at least two acid halide groups to thereby form a separating functional layer comprising crosslinked polyamide on the porous substrate film by means of interfacial polycondensation, wherein the aqueous solution comprising polyfunctional amine is made to contain monofunctional amine.

When monofunctional amine is dissolved in water and is brought into contact with a semipermeable membrane, the number of the carbon atoms which constitute the amine is preferably 7 or less since high solubility can be obtained. When monofunctional amine having high solubility is used, the hydrophilicity of the membrane itself increases due to the presence of the hydrophilic compound in the semipermeable membrane and the water permeability of the semipermeable membrane, which is one factor of the membrane performance becomes high. Accordingly, it is preferred that the total number of the carbon atoms constituting the monofunctional amine is from 1 to 7, and more preferably from 1 to 5.

The monofunctional amine is preferably present in an amount of 0.1 to 15 mol %, and more preferably from 0.5 to 10 mol %, per all the amine molecules in the separating functional layer comprising polyamide. When the amount of the monofunctional amine is 0.1 mol % or more, the membrane can fully exhibit boron removal performance. When it is 15 mol % or less, the crosslinked polyamide which is the main backbone of the separating functional layer is sufficiently formed. The proportion of the monofunctional amine in the separating functional layer can be determined by heating the separating functional layer peeled from the substrate film in a strong alkali solution to obtain a hydrolyzed sample, and measuring $^1$H-NMR of the sample.

The method of making an aliphatic acyl group exist in the separating functional layer is not also particularly limited. For example, a solution of an aliphatic acid halide is brought into contact with the surface of a separating functional layer formed by interfacial polycondensation of polyfunctional amine and polyfunctional acid halide; or during interfacial polycondensation of polyfunctional amine and polyfunctional aromatic acid halide, an aliphatic acid halide is made present in the reaction system to thereby make the aliphatic acyl group exist in the separating functional layer via a covalent bond.

Specifically, in the formation of the separating functional layer comprising polyamide on a porous substrate film, the separating functional layer comprising polyamide can be obtained by means of interfacial polyconsideration by contacting, on the porous substrate film, an aqueous solution comprising polyfunctional amine, an organic solvent solution comprising polyfunctional acid halide, and an organic solvent solution comprising aliphatic acid halide which is different from the polyfunctional acid halide and has 1 to 4 carbon atom(s); or can be obtained by means of interfacial polyconsideration by contacting, on the porous substrate film, an aqueous solution comprising polyfunctional amine with an organic solvent solution comprising polyfunctional acid halide and aliphatic acid halide which is different from the polyfunctional acid halide and has 1 to 4 carbon atom(s).

In this case, the aliphatic acid halide for use in the present invention generally has 1 to 4 carbon atom(s), and preferably 2 to 4 carbon atoms. When the carbon number is within this range, the steric hindrance is low so that the aliphatic acid halide can easily approach the reaction center to thereby smoothly form the membrane.

Examples of the aliphatic acid halide include methanesulfonyl chloride, acetyl chloride, propionyl chloride, butyryl chloride, oxalyl chloride, malonic acid dichloride, succinic acid dichloride, maleic acid dichloride, fumaric acid dichloride, chlorosulfonylacetyl chloride, N,N-dimethylaminocarbonyl chloride, and the like, and they can be used alone or as a mixture thereof.

The composite semipermeable membrane thus obtained preferably has a TDS transmission coefficient of the membrane is $3\times10^{-8}$ m/s or less, preferably from $0.1\times10^{-8}$ to $3\times10^{-8}$ m/s, when seawater at 25° C. having a pH of 6.5, a boron concentration of 5 ppm and a TDS concentration of 3.5% by weight is permeated under an operation pressure of 5.5 MPa. When the TDS transmission coefficient is within this range, the boron removal performance which is the effect of the present invention can be sufficiently obtained. The solute transmission coefficient can be obtained according to the method described below. The following formulae are known as reverse osmosis transportation equations based on non-equilibrium thermodynamics.

$$Jv = Lp(\Delta P - \sigma \cdot \Delta \pi) \qquad (1)$$

$$Js = P(Cm - Cp) + (1-\sigma)C \cdot Jv \qquad (2)$$

Herein, Jv is a permeate flow volume through the membrane (m$^3$/m$^2$/s); Lp is a pure water transmission coefficient of the membrane (m$^3$/m$^2$/s/Pa); ΔP is the pressure difference on both sides of the membrane (Pa); σ is a solute reflection coefficient of the membrane; Δπ is an osmotic pressure difference on both sides of the membrane (Pa); Js is a solute membrane permeation flow rate (mol/m$^2$/s); P is a transmission coefficient of the solute (m/s); Cm is a solute concentration on the surface of the membrane (mol/m$^3$); Cp is a permeate concentration through the membrane (mol/m$^3$); and C is a concentration on both sides of the membrane (mol/m$^3$). The mean concentration C on both sides of the membrane does not have any substantial meaning when the concentration difference on both sides of the membrane is extremely large, such as the case of reverse osmosis membranes. Accordingly, the following formula, which is derived by integrating formula (2) relative to the membrane thickness, is well used.

$$R = \sigma(1-F)/(1-\sigma F) \qquad (3)$$

wherein $$F = \exp\{-(1-\sigma)Jv/P\} \qquad (4)$$

and R is a true rejection and is defined as follows:

$$R = 1 - Cp/Cm \qquad (5)$$

When ΔP is varied, then Lp is computed as in formula (1). When R is measured while Jv is varied and when formulae (3) and (4) are curve-fitted relative to the plotting of R and 1/Jv, then P and σ can be obtained at the same time.

Designed in the manner as above, the composite semipermeable membrane of the present invention satisfies the following relationship when seawater at 25° C. having a pH of 6.5, a boron concentration of 5 ppm and a TDS concentration of 3.5% by weight is permeated under an operation pressure of 5.5 MPa:

Boron removal ratio (%)≧95−4×membrane permeation flow rate (m$^3$/m$^2$·day).

The composite semipermeable membrane which satisfies the relationship provides high-level boron rejection performance which no other membrane could provide, and this is extremely useful for boron removal in replacement of seawater by fresh water.

Particularly, by using the composite semipermeable membrane in which monofunctional amine binds to and/or adhere to the inside and/or surface of the separating functional layer, when seawater at 25° C. having a pH of 6.5, a boron concentration of 5 ppm and a TDS concentration of 3.5% by weight is permeated under an operation pressure of 5.5 MPa, the membrane permeation flow rate can be 0.5 m³/m²·day or more, preferably from 0.5 to 1.5 m³/m²·day, and the boron removal ratio can be 93% or more, preferably from 93% to 100%. Also, the boron concentration can be measured by using an ICP emission spectrophotometer.

The porous substrate film in the composite membrane of the present invention does not substantially have separating performance of ions, etc., and is used for reinforcing the separating functional layer which substantially has separating performance of the membrane. The pore size and the pore distribution in the porous substrate film are not particularly limited. For example, it is preferable that the substrate film has uniform pores, or has pores distributed in such a manner that their size gradually increases from the side of the film face coated with the separating functional layer to the other side thereof and the pore size on the side of the separating functional layer-coated face of the film is 100 nm or less, and preferably from 0.1 to 100 nm.

The material and the shape of the porous substrate film are not also particularly limited. For example, preferred are polysulfone, cellulose acetate, polyvinyl chloride or their mixtures reinforced with a fabric which comprises, as a main component, at least one selected from polyester and aromatic polyamide. Polysulfone having high chemical, mechanical and thermal stability is especially preferred for the used material.

Specifically, polysulfone having a repeating unit of a chemical formula described below is more preferred, since its pore size control is easy and its dimensional stability is high.

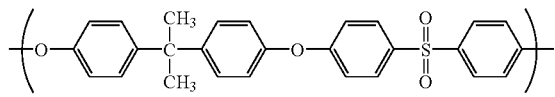

For example, an N,N-dimethylformamide (DMF) solution of the polysulfone is cast onto a base material, such as a densely-woven or nonwoven fabric of polyester, to form thereon a layer having a predetermined thickness, followed by wet-solidification in water to give a porous substrate film. The major part of the surface of the substrate film thus formed has pores having a diameter of 10 nm or less.

The thickness of the aforesaid porous substrate film and of the base material will affect the strength of the composite semipermeable membrane and the packing density when an element is produced. In order to obtain sufficient mechanical strength and packing density, it is preferably from 50 to 300 μm, and more preferably from 75 to 200 μm. Furthermore, the thickness of the porous substrate is preferably from 10 to 200 μm, and more preferably from 30 to 100 μm.

The porous substrate film formation can be observed by means of a scanning electron microscope, a transmission electron microscope or an atomic force microscope. For example, where observation is carried out with a scanning electron microscope, the porous substrate is peeled away from the base material, after which it is sectioned by a freeze-sectioning method, to produce the sample for observation of the cross-section. This sample is thinly coated with platinum, platinum-palladium or ruthenium tetroxide, preferably with ruthenium tetroxide, and observation carried out with a high resolution field emission type scanning electron microscope (UHR-FE-SEM) at an acceleration voltage of 3 to 6 kV. For the high resolution field emission type scanning electron microscope, there can be used for example a model S-900 type electron microscope made by Hitachi Ltd. The film thickness of the porous substrate and the diameter of the surface pores is determined from the electron micrograph obtained. Now, the thickness and pore diameter referred to in the present invention are average values.

Next, methods for producing the composite semipermeable membrane of the present invention are described below.

The backbone of the separating functional layer which constitutes the composite semipermeable membrane can be formed, for example, on the surface of a porous substrate film, by interfacial polycondensation of an aqueous solution comprising the above-described polyfunctional amine and a solution of a water-immiscible organic solvent comprising polyfunctional acid halide.

The concentration of the polyfunctional amine in the aqueous solution comprising polyfunctional amine is preferably 2.5 to 10% by weight, and more preferably 3 to 5% by weight. When the concentration is within this range, sufficient salt removal performance and water permeability can be obtained to thereby achieve a TDS transmission coefficient of $3 \times 10^{-8}$ n/s or less. The aqueous solution comprising polyfunctional amine can contain any other surfactant, organic solvent, alkaline compound and antioxidant not interfering with the reaction of the polyfunctional amine with the polyfunctional acid halide. The surfactant improves the wettability of the surface of the porous substrate film, and is effective for reducing the surface tension between the aqueous amine solution and a non-polar solvent. The organic solvent may act as a catalyst for interfacial polycondensation, and adding it to the reaction system may promote the interfacial polycondensation.

In order to carry out the interfacial polycondensation on the porous substrate film, the above-described aqueous solution of polyfunctional amine is first brought into contact with the film. Preferably, the solution is uniformly and continuously brought into contact with the surface of the film. Specifically, for example, the porous substrate film can be coated with or dipped in the aqueous solution comprising polyfunctional amine. The contact time between the porous substrate film and the aqueous solution comprising polyfunctional amine is preferably from 1 to 10 minutes, and more preferably from 1 to 3 minutes.

After the aqueous solution comprising polyfunctional amine has been contacted with the porous substrate film, the film is well dewatered so that no liquid drops remain on the film. The well dewatering can inhibit decrease of the film performance such that some liquid drops remained on the film become face defects. The dewatering can be carried out, for example, as described in JP-A 2-78428. Specifically, the porous substrate film is, after contacted with the aqueous solution comprising polyfunctional amine, held vertically so that the excess aqueous solution is made to spontaneously flow downward; or it is exposed to nitrogen air or the like that is blowing toward it through an air nozzle to thereby forcedly dewater it. After thus dewatered, the film surface can be dried to remove a part of the water in the aqueous solution.

Next, the substrate film is, after thus contacted with the aqueous solution comprising polyfunctional amine, further contacted with an organic solvent solution comprising a polyfunctional acid halide to thereby form the skeleton of a crosslinked separating functional layer comprising polyamide by means of interfacial polycondensation.

The concentration of the polyfunctional acid halide in the organic solvent solution is preferably from 0.01 to 10% by weight, and more preferably from 0.2 to 2.0% by weight. When the concentration is within this range, sufficient reaction rate can be obtained and side reactions can be inhibited. Furthermore, an acylation catalyst, such as N,N-dimethylformamide, is preferably added to the organic solvent solution to thereby promote the interfacial polycondensation.

Preferably, the organic solvent is immiscible with water, dissolves acid halides, and does not break the porous substrate film. For it, employable is any one inert to amino compounds and acid halides. Preferred examples include hydrocarbon compounds, such as n-hexane, n-octane, and n-decane.

A method for contacting the organic solvent solution comprising polyfunctional acid halide with the phase of the aqueous amino compound solution can be carried out in the same manner as the method for coating the porous substrate film with the aqueous solution comprising polyfunctional amine.

After the organic solvent solution comprising acid halide is brought into contact with the phase of the aqueous amino compound solution for interfacial polycondensation to form a separating functional layer comprising crosslinked polyamide on the porous substrate film in the manner as above, it is preferred that the excess solvent is removed from the film. For removing it, for example, the film is held vertically so that the excess organic solvent is made to spontaneously flow downward. In this case, the time for which the film is held vertically is preferably from 1 to 5 minutes, and more preferably from 1 to 3 minutes. When the time is within this range, the separating functional layer can be completely formed, and defects caused by over-drying of the layer are not caused.

In the method of producing the composite semipermeable membrane of the present invention, for example, the above-described monofunctional amine is added to the above-described aqueous solution comprising polyfunctional amine so that the composite semipermeable membrane in which monofunctional amine binds to and/or adhere to the inside and/or surface of the separating functional layer is formed. Preferably, the concentration of the monofunctional amine is from 0.01 to 10% by weight, and more preferably from 0.05 to 8% by weight. When the concentration is within this range, the boron removal performance which is the effect of the present invention can be sufficiently obtained without losing the salt removal performance of the separating functional layer.

In the present invention, it is also possible that the crosslinked separating functional layer comprising polyamide formed by means of interfacial polycondensation of the aqueous solution comprising polyfunctional amine and the organic solvent solution comprising polyfunctinoal acid halide is brought into contact with a solution comprising monofunctional amine to thereby form the composite semipermeable membrane. As the method for contacting the crosslinked separating functional layer comprising polyamide with monofunctional amine, for example, employable are a method in which monofunctional amine is dissolved in a solvent not corroding composite semipermeable membranes, and the resulting solution is applied to a composite semipermeable membrane; and a method in which a composite semipermeable membrane is dipped in the solution. The solvent not corroding composite semipermeable membranes is a solvent which does not dissolve or does not significantly swell the semipermeable layer skeleton and the porous substrate film of the composite semipermeable membrane, and does not significantly detract from the membrane performance. Preferred examples of the solvent include water, alcohols and hydrocarbons. Among these, water is preferred in consideration of the solubility, handlability and cost therein of monofunctional amine.

In this case, the concentration of the monofunctional amine is preferably from 0.1 to 20% by weight, and more preferably from 0.5 to 10% by weight, per the solvent. When the concentration is 0.1% by weight or more, the boron removal performance which is the effect of the present invention can be sufficiently obtained by losing the rejection performance of the separating functional layer. When it is 20% by weight or less, sufficient solubility for the solvent can be obtained at low cost.

The composite semipermeable membrane produced according to the above-described method can be subjected to hydrothermal treatment at a temperature of 50 to 150° C., and preferably 70 to 130° C., for 1 to 10 minutes, and preferably for 2 to 8 minutes, and the treatment can further improve the rejection performance and water permeability of the resulting composite semipermeable membrane.

On the other hand, in the production of the composite semipermeable membrane in which an aliphatic acyl group binds to the separating functional layer, for example, an organic solvent solution containing the above-described polyfunctional acid halide and aliphatic acid halide which is different from the polyfunctional acid halide is brought into contact with the substrate film which has been brought into contact with the above-described aqueous solution comprising polyfunctional amine; or the polyfunctional acid halide is brought into contact with the substrate film which has been brought into contact with the aqueous solution comprising polyfunctional amine to thereby form a separating functional layer comprising crosslinked polyamide on the substrate film by means of interfacial polycondensation, followed by contacting with an organic solvent solution comprising aliphatic acid halide which is different from the polyfunctional acid halide.

In this case, the concentration of the polyfunctional acid halide in the organic solvent solution is also preferably from 0.01 to 10% by weight, more preferably from 0.02 to 2% by weight. When the concentration is 0.01% by weight or more, sufficient reaction rate can be obtained. When it is 10% by weight or less, side reactions can be inhibited. Furthermore, an acylation catalyst such as N,N-dimethylformamide is preferably added to the organic solvent solution for promoting the interfacial polycondensation.

When the aliphatic acid halide is brought into contact with the substrate film after a substantial separating functional layer has been formed by means of interfacial polycondensation of the polyfunctional amine and the polyfunctional acid halide, its concentration is preferably at least 3 mol % per the polyfunctional acid halide. When the concentration is 3 mol % or more, the boron removal performance which is the effect of the present invention can be sufficiently obtained. When it is 100 mol % or less, deterioration of the environment due to non-reacted reagents can be inhibited without increasing economical costs for treating the reagents. Thus, the concentration is preferably 100 mol % or less. Also, the concentration is more preferably 10 to 50 mol %. On the other hand, when the polyfunctional acid halide and the aliphatic acid halide are mixed in the same organic solvent solution to form the separating functional layer, the concentration of the aliphatic acid halide is preferably from 3 to 50 mol %, and more preferably from 10 to 30 mol %, per the polyfunctional acid halide. When the concentration is 3 mol % or more, the boron removal performance which is the object of the present invention can be sufficiently obtained. When it is 50 mol % or less, decrease of the salt removal performance and the permeation flow rate can be inhibited.

The composite semipermeable membrane thus formed of the present invention is favorable for a spiral, composite semipermeable membrane element, in which the membrane of the present invention is wound around a water collector tube having a large number of holes formed therethrough, along with a crude water pass material such as plastic net and a permeate water pass material such as tricot and optionally a film for increasing the pressure resistance of the element. The elements can be connected in series or in parallel and housed in a pressure container to construct a composite semipermeable membrane module.

The composite semipermeable membrane and its element and module can be combined with a pump for feeding crude water thereto and with a equipment for crude water pretreatment to construct a fluid separation equipment. By using the separation equipment, crude water can be separated into permeate water such as drinking water and concentrated water not having permeated through the membrane, and the objective water can be obtained.

When the operation pressure to the fluid separation equipment is high, the boron removal ratio becomes high, but the energy necessary for operation becomes also high. Therefore, in consideration of the durability of the composite semipermeable membrane, the operation pressure under which crude water is led to pass through the membrane is preferably from 1.0 to 10 MPa. When the temperature of crude water to be treated is high, the boron removal ratio is increased; but when the temperature is low, the membrane permeation flow rate is decreased. Therefore, the temperature is preferably from 5° C. to 45° C. When the pH of crude water is high, boron in the crude water is dissociated into a boride ion so that the boron removal ratio is increased. However, high-brackish water such as seawater may form scale of magnesium and high-pH water may worsen the membrane. Therefore, it is preferable that the equipment is operated in a neutral region.

The present invention is explained below in detail based on Examples and Comparative Examples. Unless otherwise indicated, "%" is "% by weight".

The measurements in Examples and Comparative Examples were carried out as follows:

Salt Removal Ratio:

Seawater controlled to have a temperature of 25° C. and a pH of 6.5 (and having a TDS concentration of about 3.5% and a boron concentration of about 5.0 ppm) is applied to a composite semipermeable membrane under an operation pressure of 5.5 MPa, and the salt concentration in the permeate is measured. The salt removal through the membrane is determined according to the following formula:

Salt removal ratio=100×{1−(salt concentration in permeate/salt concentration in seawater)}.

Membrane Permeation Flow Rate:

Seawater is applied to a composite semipermeable membrane, and the amount ($m^3$) of the permeate through $m^2$ of the membrane a day indicates the membrane permeation flow rate ($m^3/m^2 \cdot day$).

Boron Removal Ratio:

The boron concentrations in crude water and permeate are measured with an ICP emission spectrophotometer, and the boron rejection is determined as follows:

Boron removal ratio=100×{1−(boron concentration in permeate/boron concentration in crude water)}.

TDS Transmission Coefficient:

The TDS transmission coefficient is determined according to the following formula described in *Compendium of Membrane Separation Technology* (*Maku Shori Gijyutsu Taikei*), The first volume, p. 171, edited by Masayuki Nakagaki, published by Fuji-technosystem (1991):

TDS transmission coefficient (m/s)={(100−salt removal ratio)/salt removal ratio}×membrane permeation flow rate×115.7×$10^{-7}$ In the following Tables, mPDA is metaphenylenediamine; MA is methylamine; EA is ethylamine; DBA is dibutylamine; TMC is trimesic acid chloride; OC is oxalyl chloride; AC is acetyl chloride; FC is fumaryl dichloride; SC is succinyl dichloride; CSAC is chlorosulfonylacetyl chloride; EDA is ethylenediamine; and ε-CL is ε-caprolactam.

EXAMPLES 1 AND 2

A dimethylformamide (DMF) solution of 15.7% polysulfone was cast on taffeta of polyester fibers (166-dtex multifilament yarns are used for both the warp and the weft, the weaving density is 90 yarns/inch for the warp and 67 yarns/inch for the weft, and the thickness is 160 μm) at room temperature (25° C.) to a thickness of 200 μm, then immediately dipped in pure water and left therein for 5 minutes to prepare a porous substrate film, fiber-reinforced polysulfone substrate film (hereinafter referred to as "FR-PS substrate film"). Thus formed, the porous substrate film (thickness: 210 to 215 μm) was dipped in an aqueous amine solution containing polyfunctional amine and monofunctional amine as in Table 1, for 2 minutes, then gradually pulled up in the vertical direction, exposed to nitrogen blow from an air nozzle to thereby remove the excess solution from the surface of the substrate film, and then an n-decane solution containing 0.12% trimesic acid chloride and 0.18% terephthalic acid chloride was applied to it so as to completely wet its surface, and kept as such for 1 minute. Next, the film was vertically held for 2 minutes so as to remove the excess solution from it, and the film was dewatered in that manner. Next, this was washed with hot water at 90° C. for 2 minutes, and dipped in an aqueous solution of sodium hypochlorite which had been controlled to have a pH of 7 and a chlorine concentration of 200 mg/liter, for 2 minutes, and then in an aqueous solution having a sodium hydrogensulfite concentration of 1,000 mg/liter to reduce and remove the excess sodium hypochlorite. Furthermore, the film was again washed with hot water at 95° C. for 2 minutes. The composite semipermeable membranes thus obtained were tested and evaluated. Their physical data of membrane permeation flow rate, salt removal ratio and boron removal ratio are shown in Table 1.

COMPARATIVE EXAMPLES 1 AND 2

Composite semipermeable membranes were produced in the same manner as in Examples 1 and 2, for which, however, no monofunctional amine was added, or dibutylamine was added instead of monofunctional amine. The composite semipermeable membranes thus obtained were tested and evaluated. Their physical data of membrane permeation flow rate, salt removal ratio and boron removal ratio are shown in Table 1.

TABLE 1

|  | Polyfunctional amine | Monofunctional amine | Membrane permeation flow rate ($m^3/m^2 \cdot day$) | Salt removal ratio (%) | Boron removal ratio (%) | TDS transmission coefficient ($10^{-8}$ m/sec) |
|---|---|---|---|---|---|---|
| Ex. 1 | mPDA 2.9% | MA 0.5% | 0.60 | 99.70 | 94.20 | 2.00 |
| Ex. 2 | mPDA 2.9% | EA 0.5% | 0.60 | 99.70 | 93.10 | 2.00 |
| Comp. Ex. 1 | mPDA 3.4% | none | 0.80 | 99.80 | 90.40 | 1.60 |
| Comp. Ex. 2 | mPDA 2.9% | DBA 0.5% | 0.70 | 99.80 | 90.40 | 1.60 |

EXAMPLES 3 AND 4

The same porous substrate film as in Examples 1 and 2 was dipped in an aqueous amine solution containing polyfunctional amine as in Table 2, for 2 minutes, then gradually pulled up in the vertical direction, exposed to nitrogen blow from an air nozzle to thereby remove the excess solution from the surface of the substrate film, and then an n-decane solution containing 0.12% trimesic acid chloride and 0.18% terephthalic acid chloride was applied to it so as to completely wet its surface, and kept as such for 1 minute. Next, the film was vertically held for 2 minutes so as to remove the excess solution from it, and the film was dewatered in that manner. Next, an aqueous amine solution containing monofunctional amine as in Table 2 and 0.3% sodium dodecylsulfate was applied to the film, and the film was then exposed to nitrogen blow from an air nozzle to thereby remove the excess solution from the surface of the film. Then, this was washed with hot water at 90° C. for 2 minutes, and dipped in an aqueous solution of sodium hypochlorite which had been controlled to have a pH of 7 and a chlorine concentration of 200 mg/liter, for 2 minutes, and then in an aqueous solution having a sodium hydrogensulfite concentration of 1,000 mg/liter to reduce and remove the excess sodium hypochlorite. Furthermore, the film was again washed with hot water at 95° C. for 2 minutes.

The composite semipermeable membranes thus obtained were tested and evaluated. Their physical data of membrane permeation flow rate, salt removal ratio and boron removal ratio are shown in Table 2.

COMPARATIVE EXAMPLE 3

A composite semipermeable membrane was produced in the same manner as in Examples 3 and 4, for which, however, dibutylamine was added instead of monofunctional amine. The composite semipermeable membrane thus obtained was tested and evaluated. Its physical data of membrane permeation flow rate, salt removal ratio and boron removal ratio are shown in Table 2.

EXAMPLES 5 TO 13 AND COMPARATIVE EXAMPLE 4

The same porous substrate film as in Examples 1 and 2 was dipped in an aqueous solution of 3.4% m-phenylenediamine, then gradually pulled up in the vertical direction, exposed to nitrogen blow from an air nozzle to thereby remove the excess solution from the surface of the substrate film, and then an n-decane solution of a mixture of polyfunctional aromatic acid halide and aliphatic acid halide which had been combined in the ratio as in Table 3 was applied to it so as to completely wet its surface, and kept as such for 1 minute. Next, the film was vertically held for 1 minute so as to remove the excess solution from it, and the film was dewatered in that manner. Next, this was dried in air to remove the decane solvent, and then washed with running tap water so as to remove the chemicals remaining in the film. Then, this was washed with hot water at 90° C. for 2 minutes, and dipped in an aqueous solution of sodium hypochlorite which had been controlled to have a pH of 7 and a chlorine concentration of 200 mg/liter, for 2 minutes, and then in an aqueous solution containing 1,000 mg/liter of sodium hydrogensulfite. Furthermore, the film was again washed with hot water at 95° C. for 2 minutes.

The composite semipermeable membranes thus obtained were tested and evaluated. Their physical data of membrane permeation flow rate, salt removal ratio and boron removal ratio are shown in Table 3.

COMPARATIVE EXAMPLE 5

A composite semipermeable membrane was produced in the same manner as in Examples 5 to 13, for which, however, an aliphatic acid halide was not added to the n-decane solution. The composite semipermeable membrane thus obtained was tested and evaluated. Its physical data of membrane permeation flow rate, salt removal ratio and boron removal ratio are shown in Table 3.

TABLE 2

|  | Polyfunctional Amine | Monofunctional Amine | Membrane permeation flow rate ($m^3/m^2 \cdot day$) | Salt removal ratio (%) | Boron removal ratio (%) | TDS transmission coefficient ($10^{-8}$ m/sec) |
|---|---|---|---|---|---|---|
| Ex. 3 | mPDA 3.4% | MA 1.0% | 0.60 | 99.60 | 93.80 | 2.75 |
| Ex. 4 | mPDA 3.4% | EA 1.0% | 0.60 | 99.60 | 93.20 | 2.75 |
| Comp. Ex. 3 | mPDA 3.4% | DBA 1.0% | 0.60 | 99.60 | 90.20 | 2.75 |

TABLE 3

|  | Polyfunctional acid halide | Aliphatic acid halide (molar ratio to polyfunctional acid halide) | Membrane permeation flow rate (m³/m²·day) | Salt removal ratio (%) | Boron removal ratio (%) | TDS transmission coefficient (10⁻⁸ m/sec) |
|---|---|---|---|---|---|---|
| Ex. 5 | TMC 0.15% | OC 0.0022% (3 mol %) | 0.82 | 99.92 | 92.25 | 0.75 |
| Ex. 6 | TMC 0.15% | OC 0.0036% (5 mol %) | 0.69 | 99.90 | 92.95 | 0.76 |
| Ex. 7 | TMC 0.15% | OC 0.0072% (10 mol %) | 0.93 | 99.90 | 92.63 | 1.10 |
| Ex. 8 | TMC 0.15% | OC 0.014% (20 mol %) | 0.62 | 99.81 | 93.28 | 1.40 |
| Ex. 9 | TMC 0.15% | OC 0.022% (30 mol %) | 0.50 | 99.82 | 94.01 | 1.06 |
| Ex. 10 | TMC 0.15% | OC 0.036% (50 mol %) | 0.57 | 99.71 | 93.26 | 1.91 |
| Ex. 11 | TMC 0.15% | AC 0.0044% (10 mol %) | 1.07 | 99.92 | 91.35 | 1.00 |
| Ex. 12 | TMC 0.15% | FC 0.0086% (10 mol %) | 0.88 | 99.88 | 92.42 | 1.03 |
| Ex. 13 | TMC 0.15% | SC 0.0087% (10 mol %) | 0.85 | 99.89 | 92.15 | 1.12 |
| Comp. Ex. 4 | TMC 0.15% | none | 1.05 | 99.88 | 89.70 | 1.43 |
| Comp. Ex. 5 | TMC 0.15% | OC 0.072% (100 mol %) | 0.25 | 95.35 | 89.26 | 13.96 |

EXAMPLES 14 TO 22

The same porous substrate film as in Examples 1 and 2 was dipped in an aqueous solution of 3.4% m-phenylenediamine, then gradually pulled up in the vertical direction, exposed to nitrogen blow from an air nozzle to thereby remove the excess solution from the surface of the substrate film, and then an n-decane solution of polyfunctional aromatic acid halide as in Table 4 was applied to it so as to completely wet its surface, and kept as such for 1 minute. Next, the film was vertically held for 1 minute and dewatered. Next, an n-decane solution of an aliphatic acid halide as in Table 4 was applied to it so as to completely wet its surface, and kept as such for 1 minute. Then, this was vertically held for 1 minute and dewatered. Next, this was dried in air to remove the decane solvent, and then washed with running tap water so as to remove the chemicals remaining in the film. Then, this was washed with hot water at 90° C. for 2 minutes, and dipped in an aqueous solution of sodium hypochlorite which had been controlled to have a pH of 7 and a chlorine concentration of 200 mg/liter, for 2 minutes, and then in an aqueous solution containing 1,000 mg/liter of sodium hydrogensulfite. Furthermore, the film was again washed with hot water at 95° C. for 2 minutes.

The composite semipermeable membranes thus obtained were tested and evaluated. Their physical data of membrane permeation flow rate, salt removal ratio and boron removal ratio are shown in Table 4.

COMPARATIVE EXAMPLE 6

A composite semipermeable membrane was produced in the same manner as in Examples 14 to 22, for which, however, the n-decane solution of aliphatic acid halide was not applied to the substrate film. The composite semipermeable membrane thus obtained was tested and evaluated. Its physical data of membrane permeation flow rate, salt removal ratio and boron removal ratio are shown in Table 4.

TABLE 4

|  | Polyfunctional acid halide | Aliphatic acid halide (molar ratio to polyfunctional acid halide) | Membrane permeation flow rate (m³/m²·day) | Salt removal ratio (%) | Boron removal ratio (%) | TDS transmission coefficient (10⁻⁸ m/sec) |
|---|---|---|---|---|---|---|
| Ex. 14 | TMC 0.15% | OC 0.0022% (3 mol %) | 0.85 | 99.92 | 91.78 | 0.84 |
| Ex. 15 | TMC 0.15% | OC 0.0036% (5 mol %) | 0.85 | 99.86 | 91.96 | 1.40 |
| Ex. 16 | TMC 0.15% | OC 0.014% (20 mol %) | 0.92 | 99.90 | 91.40 | 1.29 |
| Ex. 17 | TMC 0.15% | OC 0.036% (50 mol %) | 0.78 | 99.88 | 92.37 | 1.04 |
| Ex. 18 | TMC 0.15% | OC 0.072% (100 mol %) | 0.86 | 99.90 | 92.19 | 0.95 |
| Ex. 19 | TMC 0.15% | AC 0.0090% (20 mol %) | 0.84 | 99.89 | 92.94 | 1.05 |
| Ex. 20 | TMC 0.15% | FC 0.017% (20 mol %) | 0.90 | 99.92 | 92.15 | 0.81 |

TABLE 4-continued

| | Polyfunctional acid halide | Aliphatic acid halide (molar ratio to polyfunctional acid halide) | Membrane permeation flow rate ($m^3/m^2 \cdot day$) | Salt removal ratio (%) | Boron removal ratio (%) | TDS transmission coefficient ($10^{-8}$ m/sec) |
|---|---|---|---|---|---|---|
| Ex. 21 | TMC 0.15% | SC 0.018% (20 mol %) | 0.82 | 99.92 | 92.55 | 0.80 |
| Ex. 22 | TMC 0.15% | CSAC 0.021% (20 mol %) | 0.81 | 99.90 | 92.07 | 0.96 |
| Comp. Ex. 6 | TMC 0.15% | none | 1.02 | 99.89 | 89.54 | 1.17 |

The results in Examples and Comparative Examples are shown in FIG. 1.

COMPARATIVE EXAMPLES 7 TO 12

The same porous substrate film as in Examples 1 and 2 was dipped in an aqueous solution in which the component(s) shown in Table 5 was/were dissolved, then gradually pulled up in the vertical direction, exposed to nitrogen blow from an air nozzle to thereby remove the excess solution from the surface of the substrate film, and then an n-decane solution of a mixture of polyfunctional aromatic acid halide and aliphatic acid halide which had been combined in the ratio as in Table 5 was applied to it so as to completely wet its surface, and kept as such for 1 minute. Next, the film was vertically held for 1 minute so as to remove the excess solution from it, and the film was dewatered in that manner. Next, this was dried in air to remove the decane solvent, and then washed with running tap water so as to remove the chemicals remaining in the film. Then, this was washed with hot water at 90° C. for 2 minutes, and dipped in an aqueous solution of sodium hypochlorite which had been controlled to have a pH of 7 and a chlorine concentration of 200 mg/liter, for 2 minutes, and then in an aqueous solution containing 1,000 mg/liter of sodium hydrogensulfite. Furthermore, the film was again washed with hot water at 95° C. for 2 minutes.

The composite semipermeable membranes thus obtained were tested and evaluated. Their physical data of membrane permeation flow rate, salt removal ratio and boron removal ratio are shown in Table 5.

Figure 2:
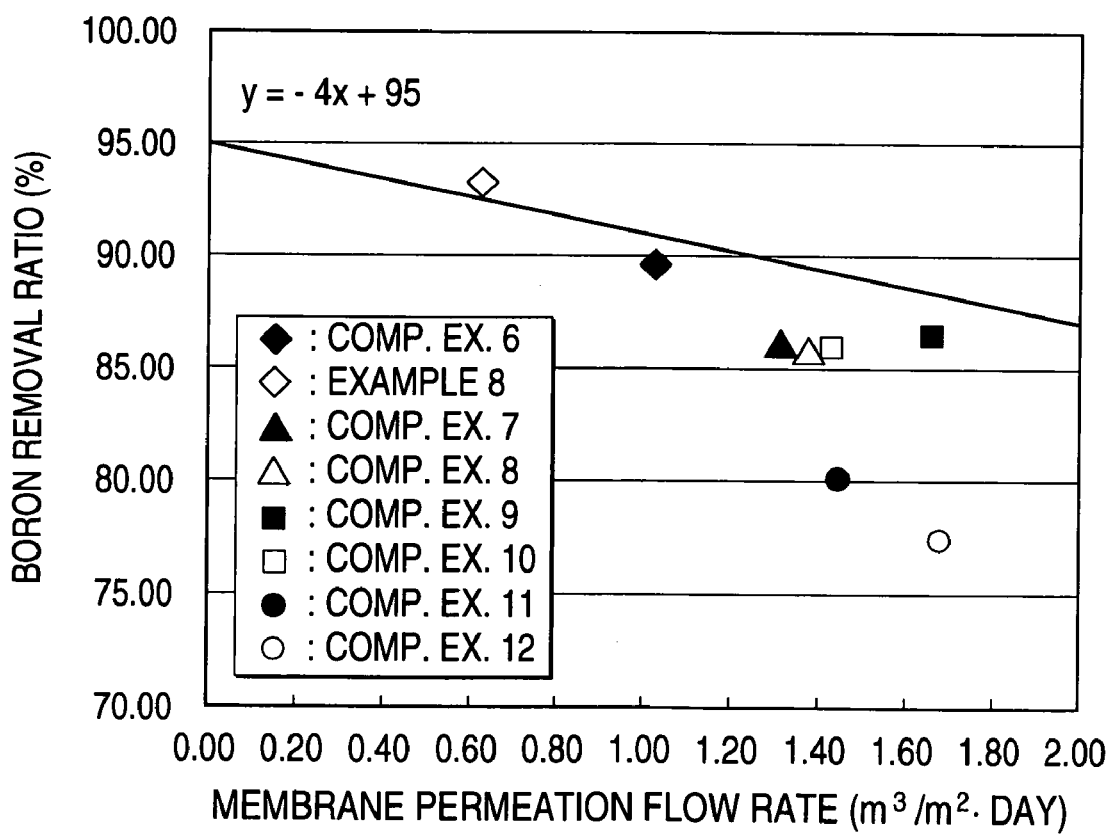
FIG. 2 is a graph showing the membrane permeation flow rate and the boron removal ratio of the membranes produced in Example and Comparative Examples.

The results of Comparative Examples 7 to 12 and Comparative Example 6 and Example 8 for comparison are shown in FIG. 2. As shown in Table 5 and FIG. 2, it was found that remarkable boron removal performance can be obtained when the TDS transmission coefficient is $3 \times 10^{-8}$ m/s or less in the present invention.

As described above, the composite semipermeable membrane of the present invention attains high salt removal and high permeate transmission, and rejects even substances which are non-dissociable in a neutral region, such as boron. Accordingly, the membrane is favorable for treatment of cooling water in atomic power plants, for treatment of plating wastes, and for production of drinking water from high-concentration brackish water or seawater.

While the present invention has been described in detail and with reference to specific embodiments thereof, it will be apparent to one of skill in the art that various changes and modifications can be made therein without departing from the spirit and scope thereof. All references cited herein are incorporated in their entirety.

This application is based on Japanese application Nos. 2003-172955 and 2003-306322 filed on Jun. 18, 2003 and Aug. 29, 2003, respectively, the entire contents of which are incorporated hereinto by reference.

What is claimed is:

1. A composite semipermeable membrane which satisfies the following relationship when seawater at 25° C. having a pH of 6.5, a boron concentration of 5 ppm and a TDS concentration of 3.5 by weight is permeated under an operation pressure of 5.5 Mpa:

TABLE 5

| | Component in aqueous solution | Acid halide (molar ratio of aliphatic acid halide to polyfunctional acid halide) | Membrane permeation flow rate ($m^3/m^2 \cdot day$) | Salt removal ratio (%) | Boron removal ratio (%) | TDS transmission coefficient ($10^{-8}$ m/sec) |
|---|---|---|---|---|---|---|
| Comp. Ex. 6 | mPDA 3.4% | TMC 0.15% | 1.02 | 99.89 | 89.54 | 1.17 |
| Ex. 8 | mPDA 3.4% | TMC 0.15% + OC 0.014% (20 mol %) | 0.62 | 99.81 | 93.28 | 1.40 |
| Comp. Ex. 7 | mPDA 3.0% + EDA 0.075% | TMC 0.10% | 1.31 | 99.77 | 86.01 | 3.51 |
| Comp. Ex. 8 | mPDA 3.0% + EDA 0.075% | TMC 0.10% + OC 0.0095% (20 mol %) | 1.37 | 99.79 | 85.70 | 3.30 |
| Comp. Ex. 9 | mPDA 2.0% | TMC 0.10% | 1.67 | 99.60 | 86.22 | 7.78 |
| Comp. Ex. 10 | mPDA 2.0% | TMC 0.10% + OC 0.0095% (20 mol %) | 1.43 | 99.77 | 85.72 | 3.81 |
| Comp. Ex. 11 | mPDA 1.5% + ε-CL 2.25% | TMC 0.075% | 1.44 | 99.76 | 80.00 | 4.04 |
| Comp. Ex. 12 | mPDA 1.5% + ε-CL 2.25% | TMC 0.075% + OC 0.0072% (20 mol %) | 1.68 | 99.62 | 77.19 | 7.31 |

Boron removal ratio (%)≧95−4×membrane permeation flow rate (m³/m²·day);

wherein:
the composite semipermeable membrane comprises a separating functional layer comprising polyamide formed on a porous substrate film, the polyamide comprising crosslinked polyamide formed by means of interfacial polycondensation by contacting, on the porous substrate film:
(a) an aqueous solution comprising polyfunctional amine,
(b) an organic solvent solution comprising polyfunctional acid halide, and
(c) an organic solvent solution comprising aliphatic acid halide, which is different from the polyfunctional acid halide and has 1 to 4 carbon atom(s);
wherein the aliphatic acid halide is at least one selected from the group consisting of methanesulfonyl chloride, acetyl chloride, propionyl chloride, butyryl chloride, oxalyl chloride, malonic acid dichloride, succinic acid dichloride, maleic acid dichloride, fumaric acid dichloride, chlorosulfonylacetyl chloride, and N,N-dimethylaminocarbonyl chloride.

2. A composite semipermeable membrane which satisfies the following relationship when seawater at 25° C. having a pH of 6.5, a boron concentration of 5 ppm and a TDS concentration of 3.5% by weight is permeated under an operation pressure of 5.5 MPa:

Boron removal ratio (%)≧95−4×membrane permeation flow rate (m³/m²·day);

wherein:
the composite semipermeable membrane comprises a separating functional layer comprising polyamide formed on a porous substrate film, the polyamide comprising crosslinked polyamide formed by means of interfacial polycondensation by contacting, on the porous substrate film:
(a) an aqueous solution comprising polyfunctional amine with
(b) an organic solvent solution comprising polyfunctional acid halide and aliphatic acid halide which is different from the polyfunctional acid halide and has 1 to 4 carbon atom(s);
wherein the aliphatic acid halide is at least one selected from the group consisting of methanesulfonyl chloride, acetyl chloride, propionyl chloride, butyryl chloride, oxalyl chloride, malonic acid dichloride, succinic acid dichloride, maleic acid dichloride, fumaric acid dichloride, chlorosulfonylacetyl chloride, and N,N-dimethylaminocarbonyl chloride.

3. The composite semipermeable membrane according to claim 1, which has a TDS transmission coefficient of $3 \times 10^{-8}$ m/s or less.

4. The composite semipermeable membrane according to claim 1, which has a membrane permeation flow rate of 0.5 m³/m²·day or more and a boron removal ratio of 93% or more.

5. The composite semipermeable membrane according to claim 2, which has a membrane permeation flow rate of 0.5 m³/m²·day or more and a boron removal ratio of 93% or more.

6. The composite semipermeable membrane according to claim 2, which has a TDS transmission coefficient of $3 \times 10^{-8}$ m/s or less.

7. A composite semipermeable membrane element which comprises the composite semipermeable membrane according to claim 1.

8. A composite semipermeable membrane element which comprises the composite semipermeable membrane according to claim 2.

9. A fluid separation equipment which comprises the composite semipermeable membrane element according to claim 7.

10. A fluid separation equipment which comprises the composite semipermeable membrane element according to claim 8.

11. A method for water treatment, which comprises using the composite semipermeable membrane according to claim 1.

12. A method for water treatment, which comprises using the composite semipermeable membrane according to claim 2.

13. The composite semipermeable membrane according to claim 1, wherein an aliphatic acyl group binds to the inside and/or surface of the separating functional layer.

14. The composite semipermeable membrane according to claim 2, wherein an aliphatic acyl group binds to the inside and/or surface of the separating layer.

* * * * *